(12) United States Patent
Yang et al.

(10) Patent No.: US 8,376,343 B2
(45) Date of Patent: Feb. 19, 2013

(54) PLATE PULLING MACHINE FOR PRESSURE FILTER

(75) Inventors: Mingjie Yang, Dezhou (CN); Baochang Liu, Hengshui (CN)

(73) Assignee: Shandong Jingjin Environmental Protection Equipment Co., Ltd., Dezhou (CN)

( * ) Notice: Subject to any disclaimer, the term of this patent is extended or adjusted under 35 U.S.C. 154(b) by 282 days.

(21) Appl. No.: 12/944,673

(22) Filed: Nov. 11, 2010

(65) Prior Publication Data
US 2011/0056060 A1 Mar. 10, 2011

Related U.S. Application Data

(63) Continuation of application No. PCT/CN2009/000722, filed on Jun. 29, 2009.

(30) Foreign Application Priority Data

Oct. 20, 2008 (CN) ...................... 2008 2 0139911 U

(51) Int. Cl.
*B25B 5/16* (2006.01)
(52) U.S. Cl. .................. 269/254 CS; 269/43; 29/244
(58) Field of Classification Search ............ 269/254 CS, 269/43, 49, 289 R, 71, 75, 55; 29/244, 255, 29/278, 270
See application file for complete search history.

(56) References Cited

U.S. PATENT DOCUMENTS

| 7,451,968 | B2 * | 11/2008 | Geldert | 269/258 |
| 7,673,861 | B2 * | 3/2010 | Meholovitch et al. | 269/181 |
| 8,210,510 | B2 * | 7/2012 | Li et al. | 269/246 |
| 2011/0024962 | A1 * | 2/2011 | Zhang | 269/107 |
| 2011/0056060 | A1 * | 3/2011 | Yang et al. | 29/244 |

* cited by examiner

*Primary Examiner* — Lee D Wilson
(74) *Attorney, Agent, or Firm* — Matthias Scholl P.C.; Matthias Scholl

(57) ABSTRACT

A plate pulling machine for a pressure filter, including a base, a support, a pair of plate-removing ears, a pair of plate-pulling ears, a plate-removing support table, a plate-pulling support table, a bracket for a bolt sleeve, a bolt sleeve, and a bolt. The support is fixed on upper end surface of the base. The plate-removing ears and the plate-pulling ears are corresponding to each other, and are disposed on both sides of the top of the support. The plate-removing support table is disposed on the plate-removing ears via a plate-removing rotating shaft. The plate-removing support table is supported via a plate-removing spring. The plate-pulling support table is disposed on the plate-pulling ears via a plate-pulling rotating shaft. The plate-pulling support table is supported via a plate-pulling spring. The bracket for a bolt sleeve is disposed on outside of the plate-pulling support table on the support.

4 Claims, 1 Drawing Sheet

PLATE PULLING MACHINE FOR PRESSURE FILTER

CROSS-REFERENCE TO RELATED APPLICATIONS

This application is a continuation of International Patent Application No. PCT/CN2009/000722 with an international filing date of Jun. 29, 2009, designating the United States, now pending, and further claims priority benefits to Chinese Patent Application No. 200820139911.2 filed on Oct. 20, 2008. The contents of all of the aforementioned applications, including any intervening amendments thereto, are incorporated herein by reference.

BACKGROUND OF THE INVENTION

1. Field of the Invention

The invention relates to a plate pulling machine for a pressure filter.

2. Description of the Related Art

Nowadays, plate pulling machines are widely used in pressure filters. However, there are several problems with the conventional plate pulling machines: the structure thereof is too complex, the amount of maintenance required is comparatively large, and the maintenance thereof is not convenient.

SUMMARY OF THE INVENTION

In view of the above-described problem, it is one objective of the invention to provide a plate pulling machine for a pressure filter that features simple structure, and convenient maintenance, and implements effective and reliable movement of a filtering plate.

To achieve the above objectives, in accordance with one embodiment of the invention, provided is a plate pulling machine for a pressure filter, comprising a base, a support, a pair of plate-removing ears, a pair of plate-pulling ears, a plate-removing support table, a plate-pulling support table, a bracket for a bolt sleeve, a bolt sleeve, and a bolt. The support is fixed on upper end surface of the base, the plate-removing ears and the plate-pulling ears are corresponding to each other, and disposed on both sides of the top of the support, the plate-removing support table is disposed on the plate-removing ears via a plate-removing rotating shaft, the plate-removing support table is supported via a plate-removing spring, the plate-pulling support table is disposed on the plate-pulling ears via a plate-pulling rotating shaft, the plate-pulling support table is supported via a plate-pulling spring, the bracket for a bolt sleeve is disposed on outside of the plate-pulling support table on the support, the bolt sleeve is fixed at the top of the bracket for a bolt sleeve, the bolt has an axis coaxial with that of the bolt sleeve, is disposed in the bolt sleeve, and is capable of moving horizontally along the axis, a groove with a through hole is disposed on one side of the bolt sleeve, and a deflector rod is disposed in the groove and fixedly connected to the bolt.

In a class of this embodiment, the plate-removing spring is a torsion spring wrapped on the plate-removing rotating shaft.

In a class of this embodiment, the plate-pulling spring is a torsion spring wrapped on the plate-pulling rotating shaft.

In a class of this embodiment, the bolt can be inserted into an inlet of the plate-pulling support table.

Advantages of the invention comprise: since the support is disposed on the base, the plate-removing ears and the plate-pulling ears corresponding thereto are disposed on both sides of the top of the support, the plate-removing support table is disposed on the plate-removing ears via the plate-removing rotating shaft, the plate-removing support table is supported via the plate-removing spring, the plate-pulling support table is disposed on the plate-pulling ears via the plate-pulling rotating shaft, the plate-pulling support table is supported via the plate-pulling spring, the bracket for a bolt sleeve is disposed on the support, the bolt sleeve is fixed at the top of the bracket for a bolt sleeve, the bolt is disposed in the bolt sleeve, a groove with a through hole is disposed on one side of the bolt sleeve, and the deflector rod is disposed in the groove and fixedly connected to the bolt. During operation of the plate pulling machine, the base is disposed on a drive chain of main beams on both sides of the pressure filter. As a motor rotates forwardly, plate pulling operation begins, the plate-pulling support table of the plate pulling machine is lifted. As the plate-pulling support table moves to a handle of a first filtering plate, the handle presses the plate-pulling support table, and the plate-pulling support table is lifted up after passing the first filtering plate. At this time the plate-removing support table is lifted, as the plate-removing support table moves to the handle of the first filtering plate, the plate-removing support table is blocked by the handle, and the motor rotates reversely. After the motor rotates reversely, the plate-pulling support table pulls the handle of the first filtering plate and the filtering plate to an unloading position. At this time the plate-removing support table is pressed by a block or the handle of the filtering plate. As the motor rotates forwardly, since the plate-removing support table is comparatively long, it is in a compressed state and crosses the handle of the filtering plate, and then the next round of plate pulling and removing operation begins. Thus the filtering plates are sequentially pulled to the unloading position. Then, the plate pulling machine moves back to a terminal of the filtering of the main beam of the pressure filter. A stop plate at the terminal presses the plate-pulling support table, and enables the bolt to enter the inlet at the back of the plate-pulling support table so that the plate-pulling support table cannot be lifted, which causes the filtering plate not to be stopped by the plate-pulling support table as the filtering is pressed. As the plate pulling machine returns to an original position, the deflector rod disposed on the main beam enables the bolt to move out from the inlet of the plate-pulling support table, the plate-pulling support table is lifted, and a plate pulling cycle is completed.

Figure 1:
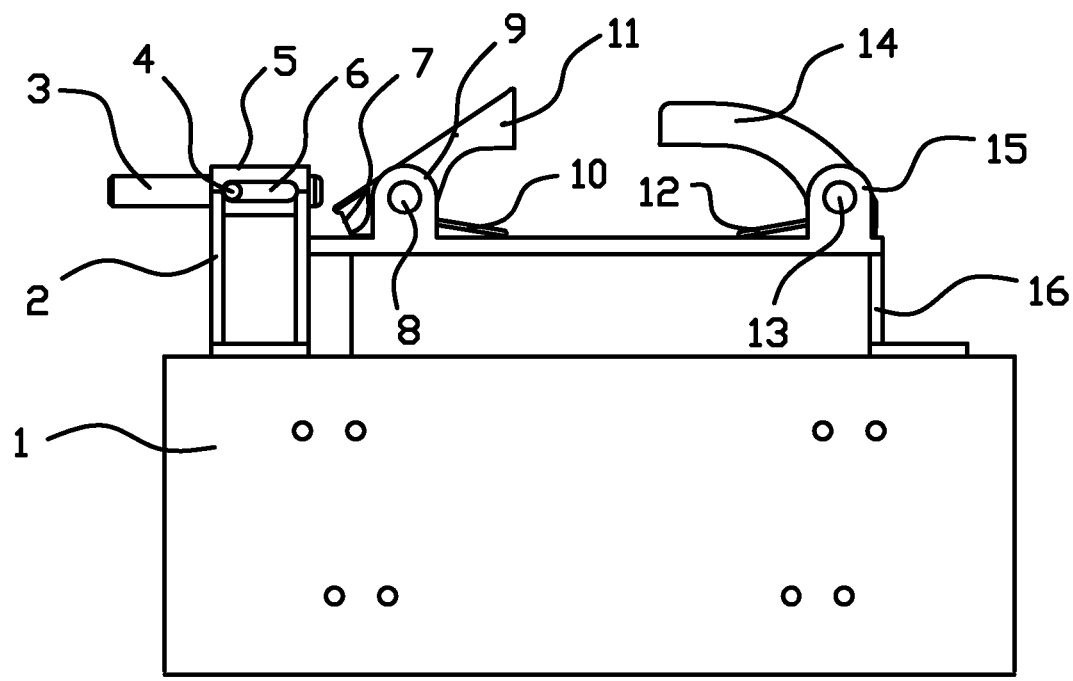
FIG. 1 is a partially cross-sectional view of a plate pulling machine for a pressure filter of an exemplary embodiment of the invention.
Figure 2:
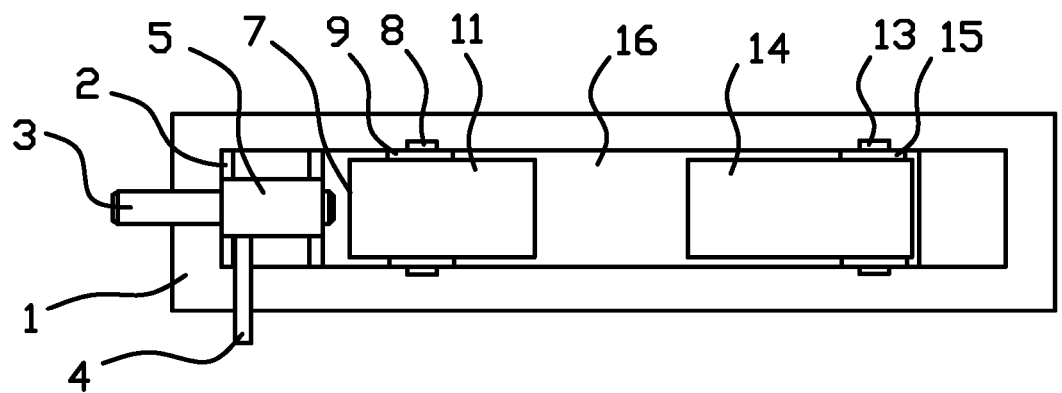
FIG. 2 is a bottom view of FIG. 1.

In the drawings, the following reference numbers are used: 1—base; 2—bracket for a bolt sleeve; 3—bolt; 4—deflector rod; 5—bolt sleeve; 6—groove; 7—inlet; 8—plate-pulling rotating shaft; 9—plate-pulling ear; 10—plate-pulling spring; 11—plate-pulling support table; 12—plate-removing spring; 13—plate-removing rotating shaft; 14—plate-removing support table; 15—plate-removing ear; 16—support

DETAILED DESCRIPTION OF THE EMBODIMENTS

For clear understanding of the invention, detailed description of the invention will be given below in conjunction with accompanying drawings and specific embodiments.

As shown in the drawings, a plate pulling machine for a pressure filter of the invention comprises a base 1, a support 16 is fixed on upper end surface of the base 1, a pair of plate-removing ears 15 and a pair of plate-pulling ears 9 corresponding thereto are disposed on both sides of the top of the support 16, a plate-removing support table 14 is disposed on the plate-removing ears 15 via a plate-removing rotating shaft 13, the plate-removing support table 14 is supported via a plate-removing spring 12, and the plate-removing spring 12 is a torsion spring wrapped on the plate-removing rotating shaft 13. A plate-pulling support table 11 is disposed on the plate-pulling ears 9 via a plate-pulling rotating shaft 8, an inlet 7 is disposed at the back of the plate-pulling support table 11, the plate-pulling support table 11 is supported via a plate-pulling spring 10, and the plate-pulling spring 10 is a torsion spring wrapped on the plate-pulling rotating shaft 8. A bracket 2 for a bolt sleeve is disposed on outside of the plate-pulling support table 11 on the support 16, a bolt sleeve 5 is fixed at the top of the bracket 2 for a bolt sleeve, a bolt 3 has an axis coaxial with that of the bolt sleeve 5 is disposed in the bolt sleeve 5, and is capable of moving horizontally along the axis, a groove 6 with a through hole is disposed on one side of the bolt sleeve 5, a deflector rod 4 is disposed in the groove 6 and fixedly connected to the bolt 3. The bolt 3 can be inserted into the inlet 7 of the plate-pulling support table 11.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A plate pulling machine for a pressure filter, comprising
   a base;
   a support;
   a pair of plate-removing ears;
   a pair of plate-pulling ears;
   a plate-removing support table;
   a plate-pulling support table;
   a bracket for a bolt sleeve;
   a bolt sleeve; and
   a bolt;
   wherein
   said support is fixed on upper end surface of said base;
   said plate-removing ears and said plate-pulling ears are corresponding to each other, and disposed on both sides of the top of said support;
   said plate-removing support table is disposed on said plate-removing ears via a plate-removing rotating shaft;
   said plate-removing support table is supported via a plate-removing spring;
   said plate-pulling support table is disposed on said plate-pulling ears via a plate-pulling rotating shaft;
   said plate-pulling support table is supported via a plate-pulling spring;
   said bracket for a bolt sleeve is disposed on outside of said plate-pulling support table on said support;
   said bolt sleeve is fixed at the top of said bracket for a bolt sleeve;
   said bolt has an axis coaxial with that of said bolt sleeve, is disposed in said bolt sleeve, and is capable of moving horizontally along said axis;
   a groove with a through hole is disposed on one side of said bolt sleeve; and
   a deflector rod is disposed in said groove and fixedly connected to said bolt.

2. The plate pulling machine of claim 1, wherein said plate-removing spring is a torsion spring wrapped on said plate-removing rotating shaft.

3. The plate pulling machine of claim 1, wherein said plate-pulling spring is a torsion spring wrapped on said plate-pulling rotating shaft.

4. The plate pulling machine of claim 1, wherein said bolt is inserted into an inlet of said plate-pulling support table.

* * * * *